United States Patent
Ajima et al.

(10) Patent No.: US 8,725,879 B2
(45) Date of Patent: May 13, 2014

(54) NETWORK INTERFACE DEVICE

(75) Inventors: Yuichiro Ajima, Kawasaki (JP);
Tomohiro Inoue, Kawasaki (JP); Shinya Hiramoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 456 days.

(21) Appl. No.: 12/699,392

(22) Filed: Feb. 3, 2010

(65) Prior Publication Data
US 2010/0306387 A1 Dec. 2, 2010

(30) Foreign Application Priority Data

Feb. 6, 2009 (JP) .................................. 2009-26533

(51) Int. Cl.
*G06F 15/16* (2006.01)
*H04L 29/08* (2006.01)

(52) U.S. Cl.
CPC ...................................... *H04L 67/14* (2013.01)
USPC ........................................................ 709/227

(58) Field of Classification Search
CPC ...................................................... H04L 67/14
USPC .................................................... 709/227
See application file for complete search history.

(56) References Cited

U.S. PATENT DOCUMENTS

| 7,007,103 B2 | 2/2006 | Pinkerton et al. | |
| 2005/0278459 A1* | 12/2005 | Boucher et al. | 709/250 |
| 2006/0015651 A1 | 1/2006 | Freimuth et al. | |
| 2006/0075130 A1* | 4/2006 | Craft et al. | 709/230 |
| 2006/0104308 A1 | 5/2006 | Pinkerton et al. | |
| 2008/0141009 A1 | 6/2008 | Minami et al. | |
| 2009/0222564 A1* | 9/2009 | Freimuth et al. | 709/228 |

FOREIGN PATENT DOCUMENTS

| JP | 7-210433 | 8/1995 |
| JP | 8-171523 | 7/1996 |
| JP | 2003-333076 | 11/2003 |
| JP | 2006-191537 | 7/2006 |
| JP | 2008-507030 | 3/2008 |
| JP | 2008-148133 | 6/2008 |

OTHER PUBLICATIONS

Korean Office Action mailed Feb. 16, 2011 issued in corresponding Korean Patent Application No. 10-2009-0131786.
European Office Action mailed Mar. 15, 2013 for corresponding European Application No. 09178493.4.
Japanese Office Action mailed Jan. 15, 2013 in corresponding Patent Application No. 2009-026533.

* cited by examiner

*Primary Examiner* — Hee Soo Kim
(74) *Attorney, Agent, or Firm* — Staas & Halsey LLP

(57) ABSTRACT

A network interface device is provided. The network interface device is connected to a computer and performs communications via a network includes a first management unit that identifies a communication connection by a port number, and manages a communication connection state of each port by a context that is stored in a storage unit and is associated with a port number, a second management unit that manages a storage state of the context, and a control unit that refers to the context, and performs an exemplary operation to establish a communication connection and an exemplary operation to cut off a communication connection between ports.

17 Claims, 18 Drawing Sheets

NETWORK INTERFACE DEVICE

CROSS-REFERENCE TO RELATED APPLICATION

This application is related to and claims priority to Japanese Patent Application No. 2009-26533, filed on Feb. 6, 2009, and incorporated herein by reference

FIELD

Embodiments discussed herein are directed to a network interface device.

BACKGROUND

Parallel computers having a plurality of exemplary operation nodes connected via a network are known. For low-delay communications among the nodes in such a parallel computer, connections for communication control may be maintained among all the nodes.

Each of the nodes in a parallel computer has a network interface device for establishing a connection with a network. The network interface device may include a network interface controller or network interface card (hereinafter referred to as "NIC"). Each of the nodes uses a network interface device to communicate with other nodes via the network. Therefore, a massively parallel computer having tens of thousands of nodes requires a network interface device that is capable of maintaining tens of thousands of communication connections.

A computer of a Web server, a database server, or the like, may use a communication protocol such as HTTP (Hyper Text Transfer Protocol) that frequently connects and disconnects communications with terminals. To achieve higher processing speed in such a computer, the protocol processing load needs to be reduced on the processors to establish and cut off communication connections.

In recent years, network communication speed has greatly increased, for example, as seen in Gigabit Ethernet. In this trend, the communication processing accounts for a large proportion of processing by the processors of computers, and problems of the lower proportion of application program processing is becoming more serious. The term "application program" will be hereinafter referred to as the term "application". Therefore, mounting of an offloading function is becoming more common, to offload part of the communication processing that is performed by processors conventionally to a network interface device.

Japanese Patent Application Laid-open Nos. 2006-191537 and 2003-333076 disclose techniques relating to an offloading function.

Japanese Patent Application Laid-open No. 2006-191537 discloses an offloading engine with which NICs perform communication processing.

Japanese Patent Application Laid-open No. 2003-333076 discloses a method of selectively offloading communication processing on a connection-unit basis by moving the communication context to a NIC after a processor establishes a communication connection.

With the NICs disclosed in Japanese Patent Application Laid-open No. 2006-191537, the capacity of the memory mounted in the offloading engine is smaller than the capacity of the main storage of each processor. Therefore, according to Japanese Patent Application Laid-open No. 2006-191537, the maximum number of communication connections among nodes is limited.

With the NICs disclosed in Japanese Patent Application Laid-open No. 2003-333076, the processing load on each processor to establish communication connections is large. Therefore, according to Japanese Patent Application Laid-open No. 2003-333076, the application processing capability of each processor is low.

SUMMARY

It is an aspect of the embodiments discussed herein to provide a network interface capable of performing communication connection establishing and disconnecting exemplary operations that are performed by processors conventionally in the communication among nodes via the network, and capable of maintaining a large number of communication connections among nodes.

The above aspects can be attained by a network interface device connected to a computer and performs communications via a network includes a first management unit that identifies a communication connection by a port number, and manages a communication connection state of each port by a context that is stored in a storage unit and is associated with a port number; a second management unit that manages a storage state of the context; and a control unit that refers to the context, and performs an exemplary operation to establish a communication connection and an exemplary operation to cut off a communication connection between ports.

The above aspects can be attained by a network interface device capable of maintaining a larger number of communication connections. Also, by performing communication connection establishing and disconnecting exemplary operations that are performed by processors conventionally, the disclosed network interface device reduces the communication processing load on the processors.

These together with other aspects and advantages which will be subsequently apparent, reside in the details of construction and exemplary operation as more fully hereinafter described and claimed, reference being had to the accompanying drawings forming a part hereof, wherein like numerals refer to like parts throughout.

DESCRIPTION OF EMBODIMENTS

Terms related to communication connections is may be defined as follows.

"Ports" is defined as having the following attributes:

1) Ports are located at both ends of a communication connection.

2) There are two types of ports: originating ports designated as the originators of communication connections; and destination ports designated as the destination of communication connections.

3) Ports are programs that are equivalent to applications, and are executed by the processors of the respective nodes.

"Applications" is defined as communication resources that are realized by communication programs belonging to the session layer of the OSI (Open System Interconnection) reference model. "Applications" may be applications that belong to the application layer and establish or cancel virtual connections for transmitting and receiving data.

"Port numbers" is defined as identification information to be used by the applications to identify the ports.

Port numbers may be numbers for identifying communication connections established by applications executed by the processors of the respective nodes. Each port number is uniquely allotted to a communication connection. According to an exemplary embodiment, serial numbers of "0", "1", "2", . . . "n" (n being a positive integer) are allotted as the port numbers to the respective ports.

According to an exemplary embodiment, "communication connection management" is defined as management of communication connections associated with the port numbers.

A communication connection indicates a form of a communication and a connection, and may be a communication connection between nodes (an end-to-end communication connection) at the transport layer of the OSI reference model.

According to an exemplary embodiment, end-to-end communications are controlled with the use of the port numbers. Communication connections to be supported, according to an exemplary embodiment, may be protocol communication connections at the transport layer of the OSI reference model, iSCSI (Internet Small Computer System Interface) protocol communication connections, and the like.

Figure 1:
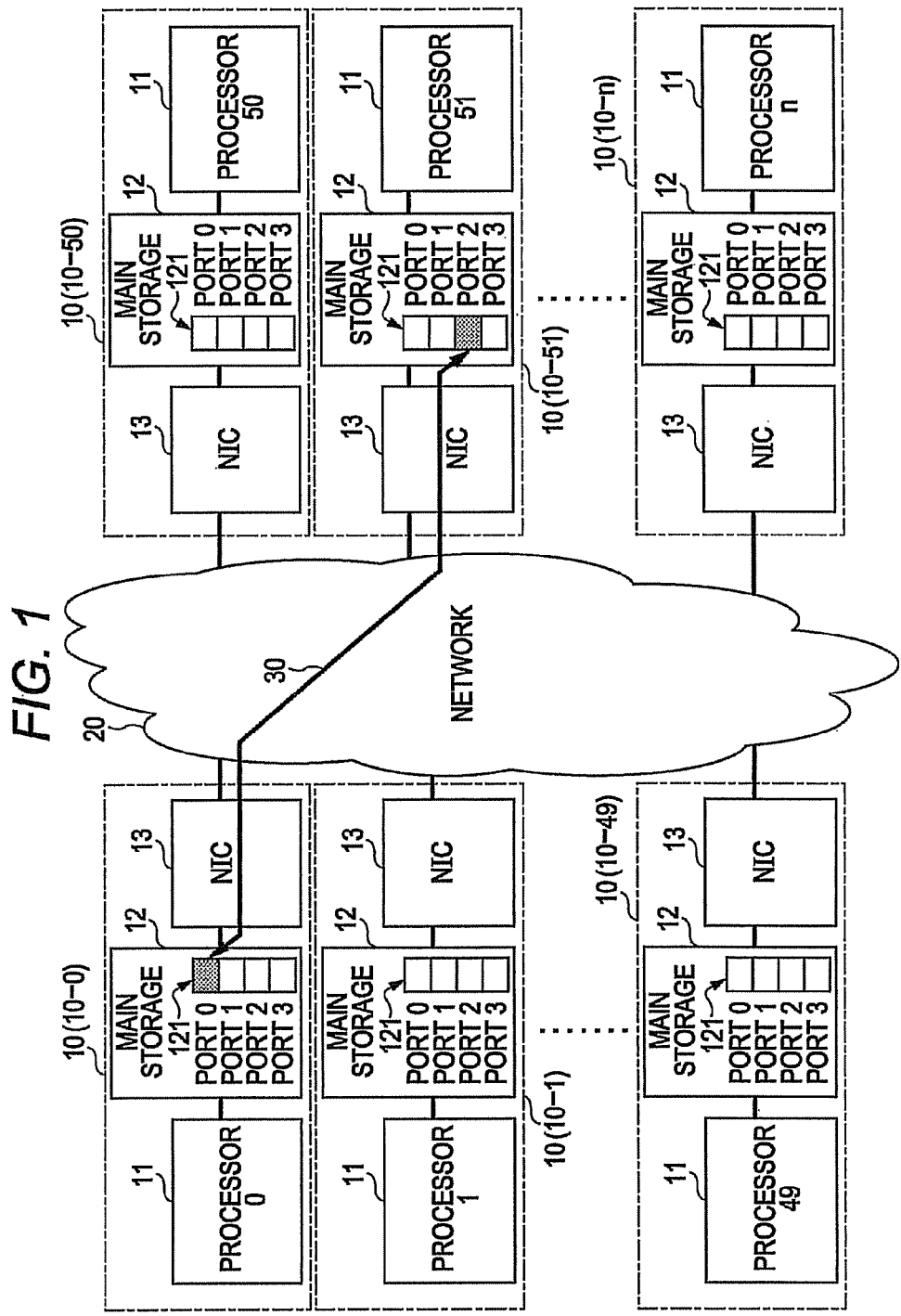
FIG. 1 illustrates an exemplary embodiment of a parallel computer.

FIG. 1 illustrates a parallel computer system according to an exemplary embodiment.

The parallel computer system 1 illustrated in FIG. 1 includes (n+1) nodes 10 (10-0, 10-1, . . . , 10-49, 10-50, 10-51, . . . , 10-n) and a network 20. Here, "n" is a positive integer.

The (n+1) nodes 10 communicate with one another via the network 20. The network 20 is an interconnection network, a LAN (Local Area Network), or the like. Each of the nodes 10 transmits and receives commands, data, and the likes, based on MPI (Message Passing Interface), for example. The commands and data to be transmitted and received among the nodes 10 are in the form of packets, for example.

Each of the nodes 10-$i$ ($i$=0 to n) includes a processor 11 (a processor 0 to processor n), a main storage 12, and a network interface controller (NIC) 13.

Each processor 11 includes a microprocessor, a chipset, and the likes. Each main storage 12 is a semiconductor memory such as a ROM (Read Only Memory) or a RAM (Random Access Memory). Each NIC 13 is a network interface controller or a network interface card, for example.

Each main storage 12 includes an area for storing software such as the operating system (OS), middleware, and application programs that are to be executed by the processor. In addition to the software storage area, each main storage 12 has an area (a port context storage area) for storing a port context that is the information used in communication processing such as communication connection establishment and disconnection, and an area for storing a port table (a port management table) that manages the port context. The port context and the port table will be described later in detail.

Each NIC 13 is capable of offloading communication processing of the processor.

From each main storage 12, each corresponding NIC 13 reads commands and data to be transmitted from the corresponding processor 11 to the processors 11 of the other nodes 10. The NIC 13 transmits the read commands and data to the NICs 13 of the other nodes 10 via the network 20. The NIC 13 also receives commands and data transmitted from the NICs 13 of the other nodes 10 via the network 20, and stores the received commands and data into the main storage 12. The transmission and reception of commands and data is performed with the use of packets, for example.

FIG. 1 illustrates an exemplary embodiment where a port table 121 having four port entries of the port 0 to the port 3 is provided in the main storage 12 of each of the nodes 10. In FIG. 1, a communication connection 30 between the port 0 (the port having the port number "0", the same applying to the following examples) of the node 10-0 and the port 2 of the node 10-51 is schematically illustrated. The communication connection 30 is a communication connection at the transport layer of the OSI reference model, for example. As illustrated in FIG. 1, each port table 121 according to the embodiment stores the port entries corresponding to the port numbers in descending order of port number.

Figure 2:
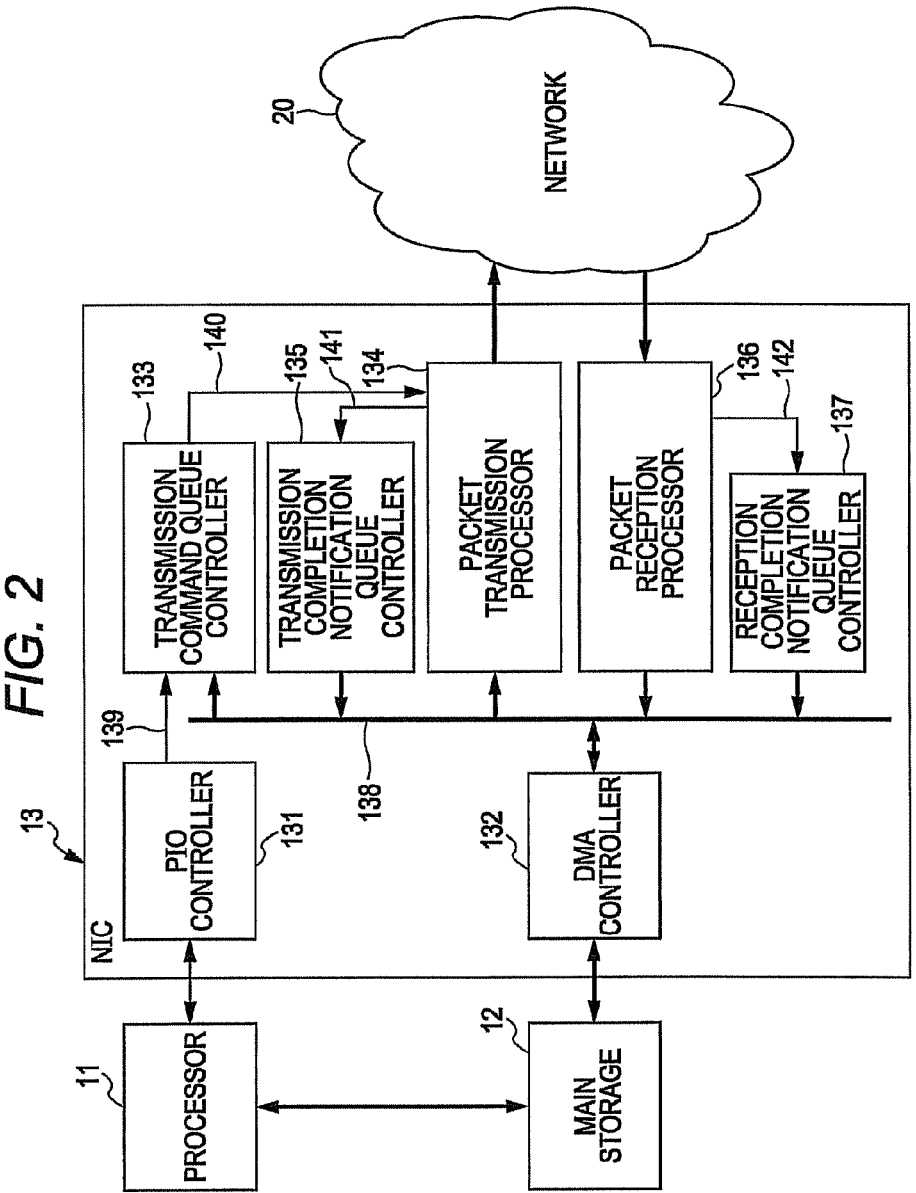
FIG. 2 illustrates an exemplary NIC.

FIG. 2 illustrates an exemplary embodiment of each NIC 13 of FIG. 1.

As illustrated in FIG. 2, each NIC 13 includes a PIO (Programmed Input/Output) controller 131, a DMA controller 132, a transmission command queue controller 133, a packet transmission processor 134, a transmission completion notification queue controller 135, a packet reception processor 136 and a reception completion notification queue controller 137. The DMA controller 132 is connected to the transmission command queue controller 133, the transmission completion notification queue controller 135, the packet transmission processor 134, the packet reception processor 136 and the reception completion notification queue controller 137, via a bus 138.

The PIO controller 131 and the transmission command queue controller 133 are connected to each other by a signal line 139. The transmission command queue controller 133 and the packet transmission processor 134 are connected to each other by a signal line 140. The packet transmission processor 134 and the transmission completion notification queue controller 135 are connected to each other by a signal line 141. The packet reception processor 136 and the reception completion notification queue controller 137 are connected to each other by a signal line 142.

Figure 3:
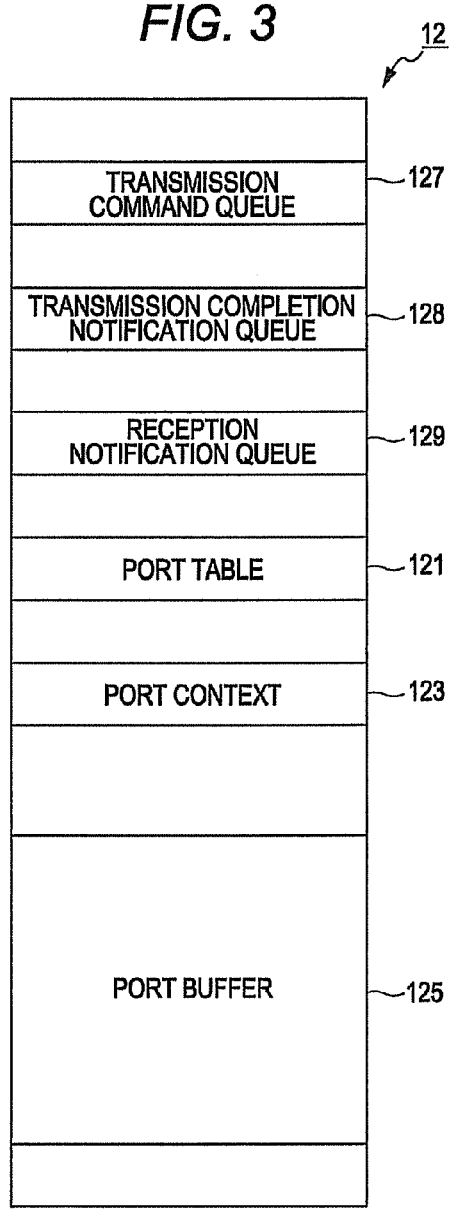
FIG. 3 illustrates an exemplary main storage of a processor.

FIG. 3 illustrates an exemplary embodiment of the main storage 12 of each processor 11.

As illustrated in FIG. 3, the main storage 12 has the port table 121, a port context 123, a port buffer 125, a transmission command queue 127, a transmission completion notification queue 128, and a reception notification queue 129. The structures and functions of the port table 121, the port context 123, the port buffer 125, the transmission command queue 127, the transmission completion notification queue 128, and the reception notification queue 129 will be described later in detail.

The PIO controller 131 is electrically connected to the processor 11. The PIO controller 131 performs transmission and reception of commands and data to and from the processor 11. The PIO controller 131 also interrupts the processor 11 as needed. The DMA controller 132 directly accesses the main storage 12 of the processor 11, without intervention of the processor 11, and performs data transfer to and from the main storage 12.

The transmission command queue controller 133 reads a descriptor of a "transmission command" from the transmission command queue 127 provided in the main storage 12 of the processor 11 via the DMA controller 132. The transmission command queue controller 133 then sends the necessary information for creating a transmission packet described in the read descriptor, to the packet transmission processor 134 via the signal line 140.

Upon receipt of the information from the transmission command queue controller 133, the packet transmission processor 134 generates a control packet or a transfer data packet (also referred to as a "data communication packet") based on the received information. The packet transmission processor 134 then transmits the generated packet to the NIC 13 of the node 10 designated by a transmission command, via the network 20. After the packet transmission is completed, the packet transmission processor 134 notifies the transmission completion notification queue controller 135 of the type of the transmitted packet via the signal line 141.

Upon receiving the notification from the packet transmission processor 134, the transmission completion notification queue controller 135 creates a descriptor of a "transmission completion notification". The transmission completion notification queue controller 135 then writes the created descriptor into the transmission completion notification queue 128 provided in the main storage 12 of the processor 11, via the DMA controller 132.

The packet reception processor 136 receives a packet transmitted from the NIC 13 of a destination node 10 via the network 20. If the received packet is a data communication packet, the packet reception processor 136 withdraws transfer data from the packet, and writes the withdrawn transfer data into the port buffer 125 provided in the main storage 12 of the processor 11 via the DMA controller 132. When receiving a packet from the network 20, the packet reception processor 136 notifies the reception completion notification queue controller 137 of the type of the received packet via the signal line 142.

Upon receiving the notification from the packet reception processor 136, the reception completion notification queue controller 137 creates a descriptor of a "reception notification", and writes the written descriptor into the reception notification queue 129 provided in the main storage 12 of the processor via the DMA controller 132.

Figure 4:
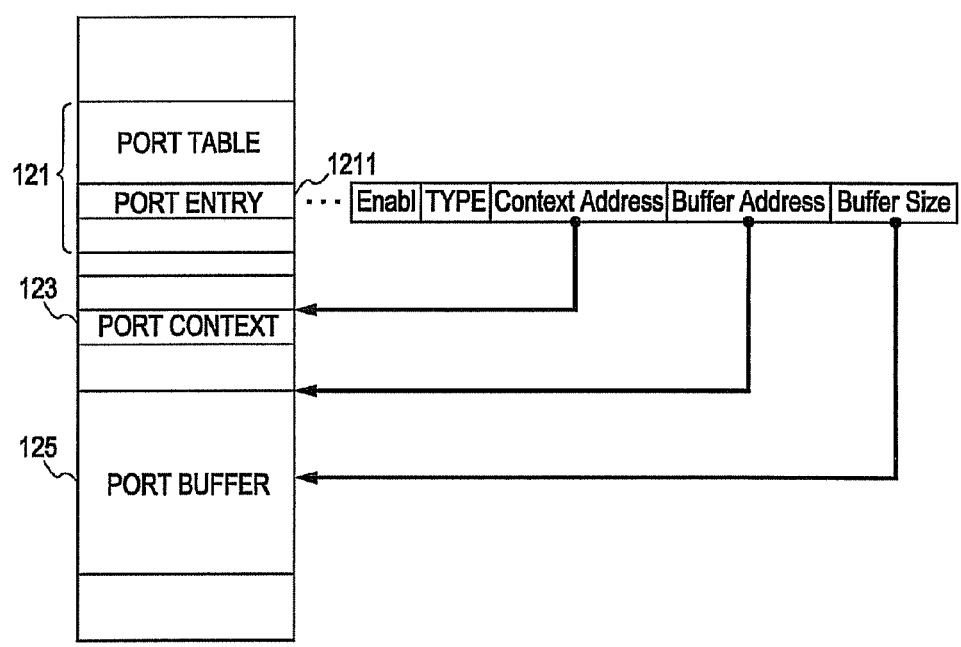
FIG. 4 illustrates a port definition in an exemplary embodiment.

FIG. 4 illustrates the port definition according to an exemplary embodiment.

According to an exemplary embodiment, communication connections are managed in conjunction with the port numbers. Communication connections are managed with the use of the port table 121, the port context 123, and the port buffer 125.

The port context 123 is information used for managing the communication connection state of the corresponding port. The port buffer 125 is a buffer that stores transfer data to be transmitted or received transfer data.

The port table 121 is a table that manages the port context 123 and the port entry 1211 of each port. The port table 121 manages the port contexts 123 of the respective ports and the port entries 1211 associated with the port numbers. The entry numbers of the port entries 1211 in the port table 121 correspond to the port numbers.

Accordingly, the port entry 1211 having the port number "n" (n being 0 or a positive integer) is registered in the entry having the entry number "n" in the port table 121.

As illustrated in FIG. 4, the port entry 1211 stores information that contains items of "Enable", "TYPE", "Context Address", "Buffer Address" and "Buffer Size". The item "Enable" is a flag that indicates whether the port entry 1211 is valid. If the port entry 1211 is valid, the "Enable" flag is "1", and if not valid, the "Enable" flag is "0". The item "TYPE" is information that indicates either "reception" or "transmission". The item "Context Address" is an address at which the port context 123 of the corresponding port is stored in the main storage 12. The item "Buffer Address" indicates the top address of the port buffer 125 of the corresponding port. The item "Buffer Size" is information that indicates a size of the port buffer 125, such as the number of bytes that can be stored in the port buffer 125.

Figure 5:
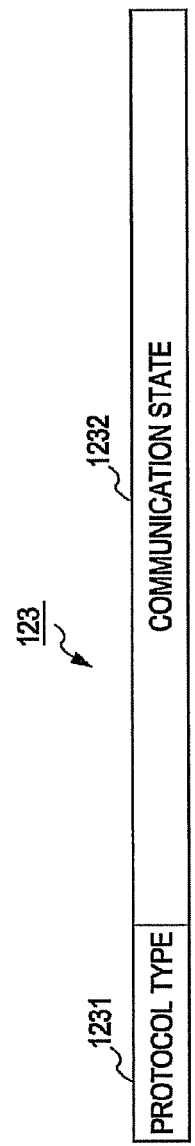
FIG. 5 illustrates an exemplary data structure of a port context.

FIG. 5 illustrates an exemplary data structure of each port context 123.

As illustrated in FIG. 5, the port context 123 includes the following information: a protocol type 1231 and a communication state 1232. The protocol type 1231 is the information that indicates a type of the communication protocol used in a communication between ports. The communication state 1232 is the information that indicates a state of a communication connection between ports. The communication state 1232 indicates a "stand-by state", a "connected state", a "connection requested state", a "disconnection notification reception completed state", or the like.

Contents of descriptors that are set in each queue are disclosed.

According to an exemplary embodiment, communication processing of each processor 11 is offloaded to each corresponding NIC 13 The processing of "communication connection establishment", "communication disconnection" and "data communication (data transfer)" is offloaded to the NIC 13. The offloading process is performed with the use of the transmission command queue 127, the transmission completion notification queue 128 and the reception notification queue 129. The processor 11 and the NIC 13 exchanges information by performing descriptor reading/writing on those queues, and realize the offloading.

The transmission command queue 127 is a queue that is used by the processor 11 to instruct the NIC 13 to "establish a communication connection (a connection request)", "transmit data (transfer data)", and "disconnect a communication line". The processor 11 writes the three commands in the transmission command queue 127, and the NIC 13 reads the commands written in the transmission command queue 127. By doing so, the processor 11 notifies the NIC 13 of the three commands.

Upon receiving a command from the processor 11 via the transmission command queue 127, the NIC 13 creates a transmission packet in accordance with the command, and transmits the transmission packet to the NIC 13 of a communication destination via the network 20. The transmission packet is a "connection request packet", a "connection response packet", a "transfer data packet", or a "disconnection notification packet", for example.

Figure 6:
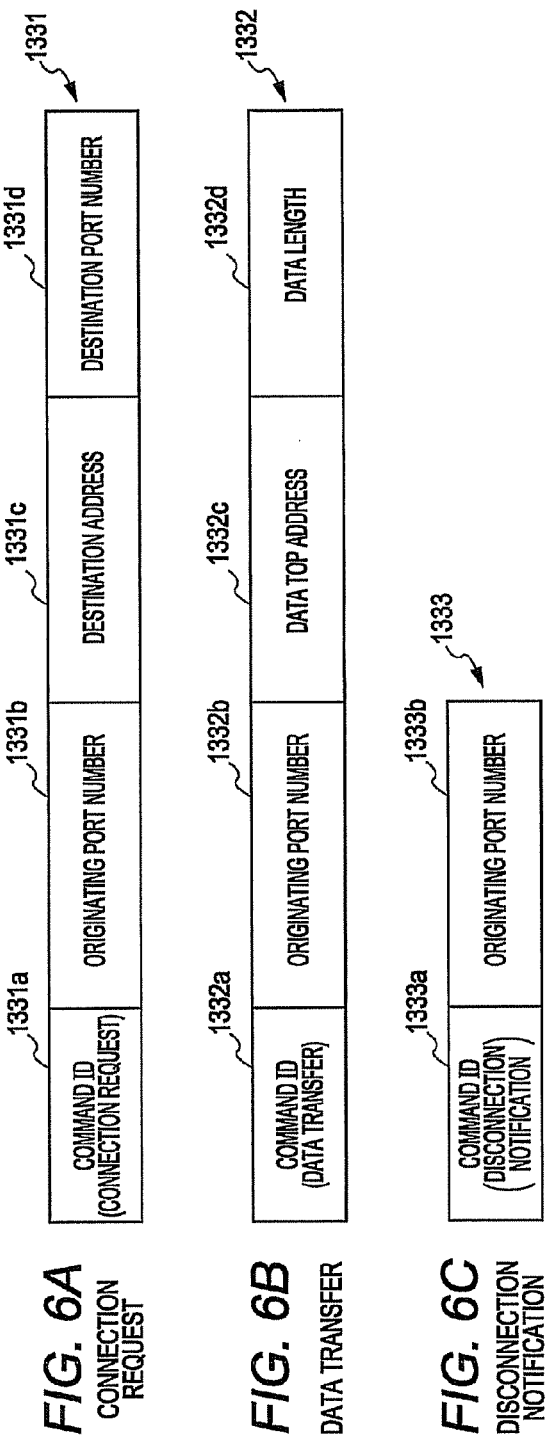
FIGS. 6A, 6B, and 6C illustrate exemplary data structures of the descriptors to be written into a transmission command queue by a processor.

FIGS. 6A through 6C illustrate data structures of descriptors to be written into the transmission command queue 127 by the processor 11. As illustrated in FIGS. 6A through 6C, there are three kinds of descriptors to be written into the transmission command queue 127 in this embodiment.

The connection request command descriptor 1331 illustrated in FIG. 6A is the descriptor to be written into the transmission command queue 127 by the processor 11 to instruct the NIC 13 to "request a connection". The connection request command descriptor 1331 has fields in which information including a command ID 1331$a$, an originating port number 1331$b$, a destination address 1331$c$ and a destination port number 1331$d$ is set.

The command ID 1331$a$ is an ID (Identifier) allotted to the "connection request" command to be sent from the processor 11 to the NIC 13. The originating port number 1331$b$ is a port number of the originating port in the communication. The destination address 1331$c$ is an address of the network layer of the OSI reference model used by the destination node 10 in the communication. The destination port number 1331$d$ is a port number of the destination port in the communication.

The port number is equal to the port number allotted to the application program of the packet source, with the application program being executed by the node 10$d$ having the destination address. Here, the node 10$d$ is the destination of the communication.

The data transfer command descriptor 1332 illustrated in FIG. 6B includes the following information: a command ID 1332$a$, an originating port number 1332$b$, a data top address 1332$c$, and a data length 1332$d$.

The data transfer command descriptor 1332 is a descriptor to be written into the transmission command queue 127 by the processor 11 to instruct the NIC 13 to "transfer data". The command ID 1332$a$ is an ID allotted to the "data transfer" command to be sent from the processor 11 to the NIC 13. The originating port number 1332$b$ is a port number of the originating port in the communication. The data top address 1332$c$ is the top address of the port buffer 125 storing the transmission data to be set in a transfer data packet (a data communication packet). The data length 1332$d$ is a size of the data stored in the port buffer 125.

The disconnection notification transmission command descriptor 1333 illustrated in FIG. 6C includes a command ID 1333$a$ and an originating port number 1333$b$. The disconnection notification transmission command descriptor 1333 is a descriptor to be written into the transmission command queue 127 by the processor 11 to instruct the NIC 13 to "disconnect a communication line". The command ID 1333$a$ is an ID allotted to the "disconnection notification transmission" command to be sent from the processor 11 to the NIC 13. The originating port number 1333$b$ is a port number of the originating port in the communication.

The transmission completion notification queue 128 is a queue used by the NIC 13 to notify the processor 11 of completion of packet transmission requested from the processor 11. When the packet transmission requested from the processor 11 is completed, the NIC 13 writes a descriptor of a "transmission completion status" into the transmission completion notification queue 128. The processor 11 reads the transmission completion status from the transmission completion notification queue 128, to confirm that the packet designated by the processor 11 has been transmitted to the NIC 13 of a communication destination.

Figure 7:
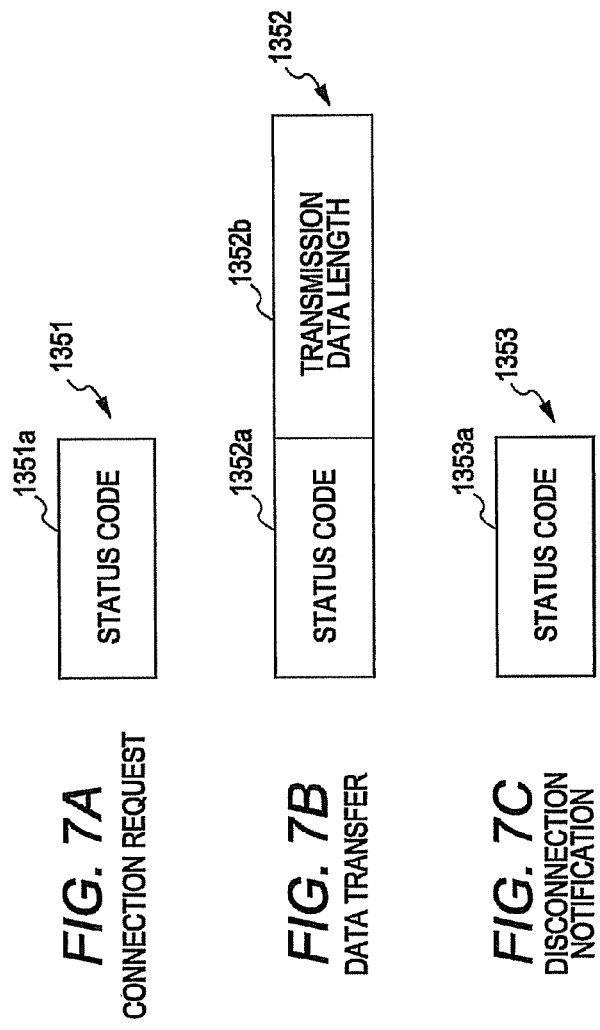
FIGS. 7A, 7B, and 7C illustrate exemplary data structures of the descriptors of transmission completion statuses to be written into a transmission completion notification queue by the transmission completion notification queue controller of an NIC.

FIGS. 7A through 7C illustrate data structures of the descriptors of the transmission completion status to be written into the transmission completion notification queue 128 by the transmission completion notification queue controller 134. The connection request transmission command completion descriptor 1351 illustrated in FIG. 7A is a descriptor that indicates the result of processing performed by the NIC 13 in response to a "connection request transmission" command from the processor 11. The connection request transmission command completion descriptor 1351 includes a status code 1351$a$. The status code 1351$a$ is a code that indicates whether the processing performed by the NIC 13 is succeeded or failed, that is, "success" or a "failure". The connection request transmission command completion descriptor 1351 is written as a "transmission completion status" of connection request transmission into the transmission completion notification queue 128 by the transmission completion notification queue controller 134 of the NIC 13.

The NIC 13 reads a "connection request" written into the transmission command queue 127 by the processor 11, and transmits a connection request packet to the NIC 13 of the connection destination via the network 20. The NIC 13 then creates the connection request transmission command completion descriptor 1351 having the result of the transmission of the connection request packet set in the status code 1351$a$, and writes the created connection request transmission command completion descriptor 1351 into the transmission completion notification queue 128.

When transmission of a connection request packet is properly completed, the status code 1351$a$ of the connection request transmission command completion descriptor 1351 is set at the code that indicates the processing is succeeded ("0", for example). When transmission of a connection request packet fails, the status code 1351$a$ of the connection request transmission command completion descriptor 1351 is set at the code that indicates the processing is failed ("1", for example). The processor 11 reads the connection request transmission command completion descriptor 1351 from the transmission completion notification queue 128. The processor 11 then refers to the status code 1351$a$ of the connection request transmission command completion descriptor 1351, to check whether the connection request packet the processor 11 has instructed the NIC 13 to transmit has been properly transmitted to the NIC 13 of the destination node 10.

The data transfer command completion descriptor 1352 illustrated in FIG. 7B is a descriptor that indicates a result of processing performed by NIC 13 in response to a "data transfer" command issued to the NIC 13 from the processor 11. The data transfer command completion descriptor 1352 includes a status code 1352$a$ and a transmission data length 1352$b$. The statue code 1352$a$ is a code that indicates whether the processing performed by the NIC 13 is succeeded or failed. The transmission data length 1351*b* is information that indicates the length of the transfer data. The data transfer command completion description 1351 is written as the "transmission completion status" of transfer data transmission into the transmission completion notification queue 128 by the transmission completion notification queue controller 134 of the NIC 13.

The NIC 13 reads a "data transfer" command written by the processor 11 from the transmission command queue 127, and then confirms that the port to which data is to be transferred is in a "connected requested state". After confirming the state of the port, the NIC 13 reads transfer data from the port buffer 125. The NIC 13 generates a transfer data packet having the read transfer data set therein, and transmits the created transfer data packet to the NIC 13 of the destination node 10 via the network 20. After completing the transmission of the transfer data packet, the NIC 13 creates the data transfer command completion descriptor 1352.

In the data transfer command completion descriptor 1352, the result of the transmission of the transfer data packet is set in the status code 1352*a*, and the data length of the transfer data is set in the transmission data length 1352*b*. The NIC 13 writes the created data transfer command completion descriptor 1352 into the transmission completion notification queue 128.

The disconnection notification transmission completion descriptor 1353 illustrated in FIG. 7C is a descriptor that indicates the result of processing performed by the NIC 13 in response to a "disconnection notification transmission" command issued to the NIC 13 from the processor 11. The disconnection notification transmission completion descriptor 1353 includes a status code 1353*a*. The status code 1353*a* is a code that indicates the result of the processing performed by the NIC 13 in response to the "disconnection notification transmission" command issued to the NIC 13 from the processor 11. The disconnection notification transmission completion descriptor 1353 is written as the "transmission completion status" of disconnection notification transmission into the transmission completion notification queue 128 by the NIC 13.

The NIC 13 reads a "disconnection notification transmission" command written by the processor 11 from the transmission command queue 127, and transmits a disconnection notification packet to the NIC 13 of the connection destination via the network 20. When the transmission of the disconnection notification packet is completed, the NIC 13 creates the disconnection notification transmission completion descriptor 1353 having the result of the transmission set in the status code 1353*a*, and writes the created disconnection notification transmission completion descriptor 1353 into the transmission completion notification queue 128.

If the transmission of the disconnection notification packet is properly completed, the status code 1353*a* in the disconnection notification transmission completion descriptor 1353 is set at the code that indicates the transmission is succeeded ("0", for example). If the transmission of the disconnection notification packet fails, the status code 1353*a* in the disconnection notification transmission completion descriptor 1353 is set at the code that indicates the transmission is failed ("1", for example).

The processor 11 reads the disconnection notification transmission completion descriptor 1353 from the transmission completion notification queue 128. The processor 11 then refers to the disconnection notification transmission completion descriptor 1353, and checks whether the disconnection notification packet the processor has instructed the NIC 13 to transmit has been properly transmitted to the NIC 13 of the destination node 10.

The reception notification queue 129 is a queue that is used by the NIC 13 to notify the processor 11 of a type of a packet received from the NIC 13 of the communication connection destination. Upon receipt of a packet from the NIC 13 of the communication connection destination, the NIC 13 writes the reception status corresponding to the type of the received packet into the reception notification queue 129.

The processor 11 reads the reception status from the reception notification queue 129, and analyzes the contents of the read reception status, to determine the contents of the notification transmitted from the processor 11 of the communication connection destination node 10.

There are reception packets of the following types: a "connection request packet" type, a "connection response packet" type, a "transfer data packet" type, a "disconnection notification packet" type, and the likes. Packets of those types are classified as control packets.

FIGS. 8A through 8D illustrate data structures of descriptors indicating reception statuses to be written into the reception notification queue 129 by the reception completion notification queue controller 137 of the NIC 13. As illustrated in FIGS. 8A through 8D, there are four kinds of descriptors to be written into the reception notification queue 129 of the NIC 13 on the packet transmission or reception side.

Figure 8:
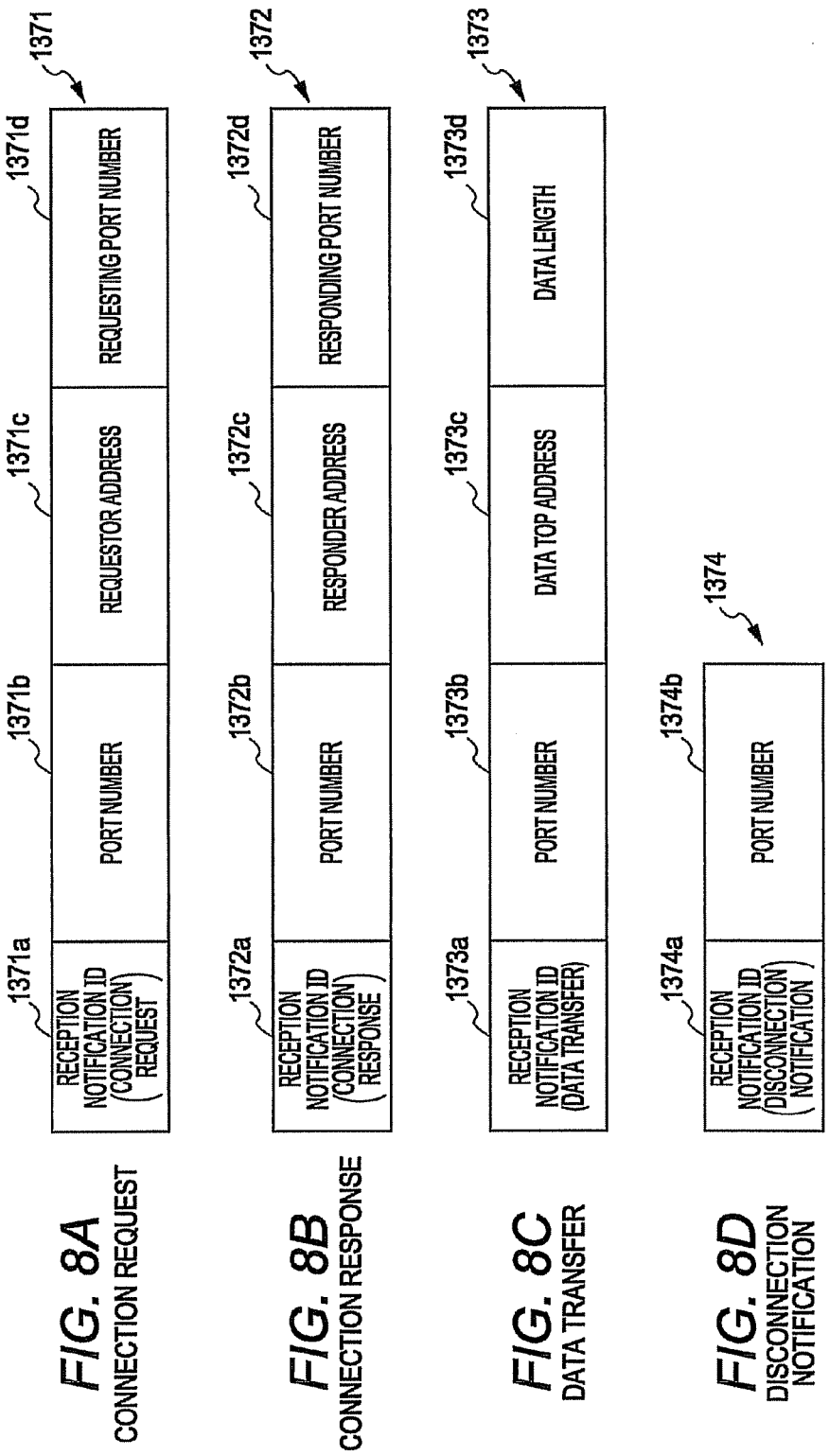
FIGS. 8A, 8B, 8C, and 8D illustrate data structures of the descriptors of reception statuses to be written into a reception notification queue by the reception completion notification queue controller of an NIC.

The connection request descriptor 1371 illustrated in FIG. 8A is a descriptor to be written into the reception notification queue 129 by the NIC 13 to notify the processor 11 in the node 10 of a "connection request" from the communication connection destination, when the NIC 13 receives a connection request packet.

The connection descriptor 1371 includes the following information: a reception notification ID 1371*a*, a port number 1371*b*, a requestor address 1371*c* and a requestor port number 1371*d*. The reception notification ID 1371*a* is an ID allotted to the reception notification of the "connection request". The port number 1371*b* is equal to the "destination port number" set in the control packet. The requestor address 1371*c* is equal to the "originator address" set in the connection request packet. The requestor port number 1371*d* is equal to the "originating port number" set in the connection request packet.

The connection response descriptor 1372 illustrated in FIG. 8B is a descriptor to be written into the reception notification queue 129 by the NIC 13 to notify the processor 11 of reception of a "connection response packet" when the NIC 13 receives the connection response packet.

The connection response descriptor 1372 includes the following information: a reception notification ID 1372*a*, a port number 1372*b*, a responder address 1372*c* and a responding port number 1372*d*.

The reception notification ID 1372*a* is an ID allotted to the reception notification of the "connection response". The port number 1372*b* is a port number that is set in the field of the "destination port number" in the connection response packet. The responder address 1372*c* is an address that is set in the field of the "originator address" in the connection response packet. The responding port number 1372*d* is a port number that is set in the field of the "originating port number" in the connection response packet. The connection response packet will be described later in detail.

The data transfer descriptor 1373 illustrated in FIG. 8C is a descriptor to be written into the reception notification queue 129 by the NIC 13 to notify the processor 11 of reception of a "data transfer packet" when the NIC 13 receives the transfer data packet. The data transfer descriptor 1373 includes the following information: a reception notification ID 1373a, a port number 1373b, a data top address 1373c and a data length 1373d.

The reception notification ID 1373a is an ID allotted to the reception notification of the "transfer data". The port number 1373b is equal to the "destination port number" set in the transfer data packet. The data top address 1373c is an address that indicates the location of the top of the transfer data in the port buffer 125. The transfer data is withdrawn from the transfer data packet and is stored into the port buffer 125 by the NIC 13. The data length 1373d is a data length of the transfer data stored in the port buffer 125. The transfer data packet will be described later in detail.

The disconnection notification descriptor 1374 illustrated in FIG. 8D is a descriptor to be written into the reception notification queue 129 by the NIC 13 to notify the processor 11 of reception of a "disconnection notification packet" when the NIC 13 receives the packet.

The reception notification ID 1374a is an ID allotted to the reception notification of the "disconnection notification". The port number 1374b is a port number of the disconnection notification sender (the originating port number). The port number 1374b is equal to the "originating port number" set in the disconnection notification packet.

Figure 9:
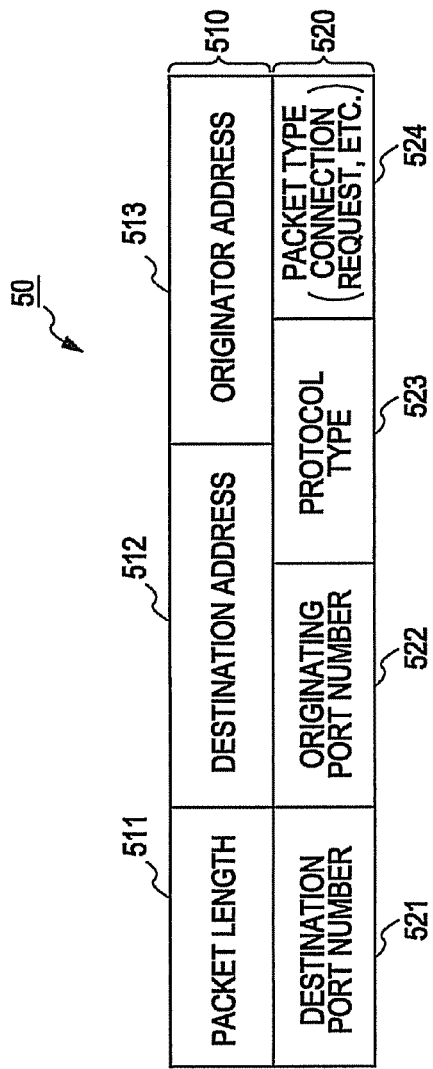
FIG. 9 illustrates an exemplary data structure of a control packet.

FIG. 9 illustrates data structure of each of control packets.

As illustrated in FIG. 9, a control packet 50 includes a network layer header 510 and a transport layer header 520. The network layer header 510 is a header equivalent to the header of the network layer of the OSI reference model. The transport layer header 520 is a header equivalent to the header of the transport layer of the OSI reference model.

The network layer header 510 includes a packet length 511, a destination address 512 and an originator address 513. The packet length 511 is a size of the entire control packet 500 (such as the length in bytes). The destination address 512 is an address of the network layer of the destination node 10 to which the control packet 50 is to be transmitted (such as the IP address). The originator address 513 is an address of the network layer of the node 10 transmitting the control packet 50 (such as the IP address).

The transport layer header 520 includes a destination port number 521, an originating port number 522, a protocol type 523 and a packet type 524.

The destination port number 521 is a port number of the application program of the destination of the communication connection. The originating port number 522 is a port number of the application program of the originator of the communication connection. The protocol type 523 is information that indicates the type of the transport layer protocol used in the communication connection. The packet type 524 is information that indicates the type of the control packet used in the communication connection.

Control packets used in this embodiment includes the "connection request packet", the "connection response packet" and the "disconnection notification packet", for example. The packet type 524 indicates one of the control packet types. In other words, when the control packet 50 is received, the type of the control packet 50 can be determined by referring to the information set in the packet type 524.

Figure 10:
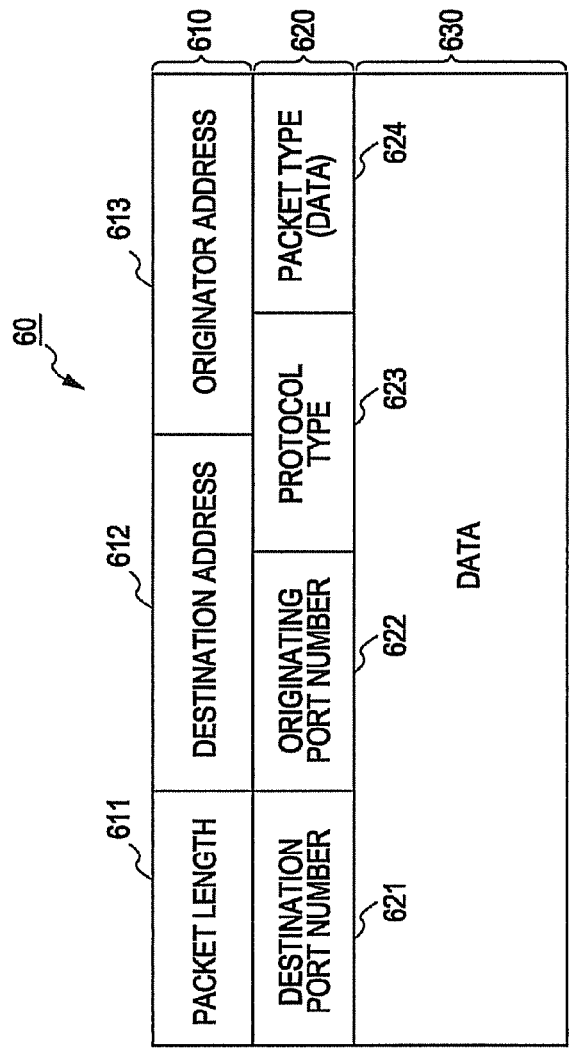
FIG. 10 illustrates an exemplary data structure of a transfer data packet.

FIG. 10 illustrates data structure of a transfer data packet.

As illustrated in FIG. 10, the transfer data packet 60 includes a network layer header 610, a transport layer header 620 and transport layer data 630.

The network layer header 610 includes a packet length 611, a destination address 612 and an originator address 613.

The packet length 611 is information that indicates the size of the entire transfer data packet. The destination address 612 and the originator address 613 are the same as the destination address 512 and the originator address 513, respectively, of the network layer header 510 of the control packet 50.

The transport layer header 620 includes a destination port number 621, an originating port number 622, a protocol type 623 and a packet type 624. The destination port number 621, the originating port number 622 and the protocol type 623 are the same as the destination port number 521, the originating port number 522 and the protocol type 523 of the transport layer header 520 of the control packet 50, respectively. The packet type 624 is the information that indicates the type of the transfer data packet 60.

The transport layer data 630 is a data about the transport layer protocol such as TCP (Transmission Control Protocol) that is carried by the transfer data packet 60.

Exemplary operations are disclosed.

Figure 11:
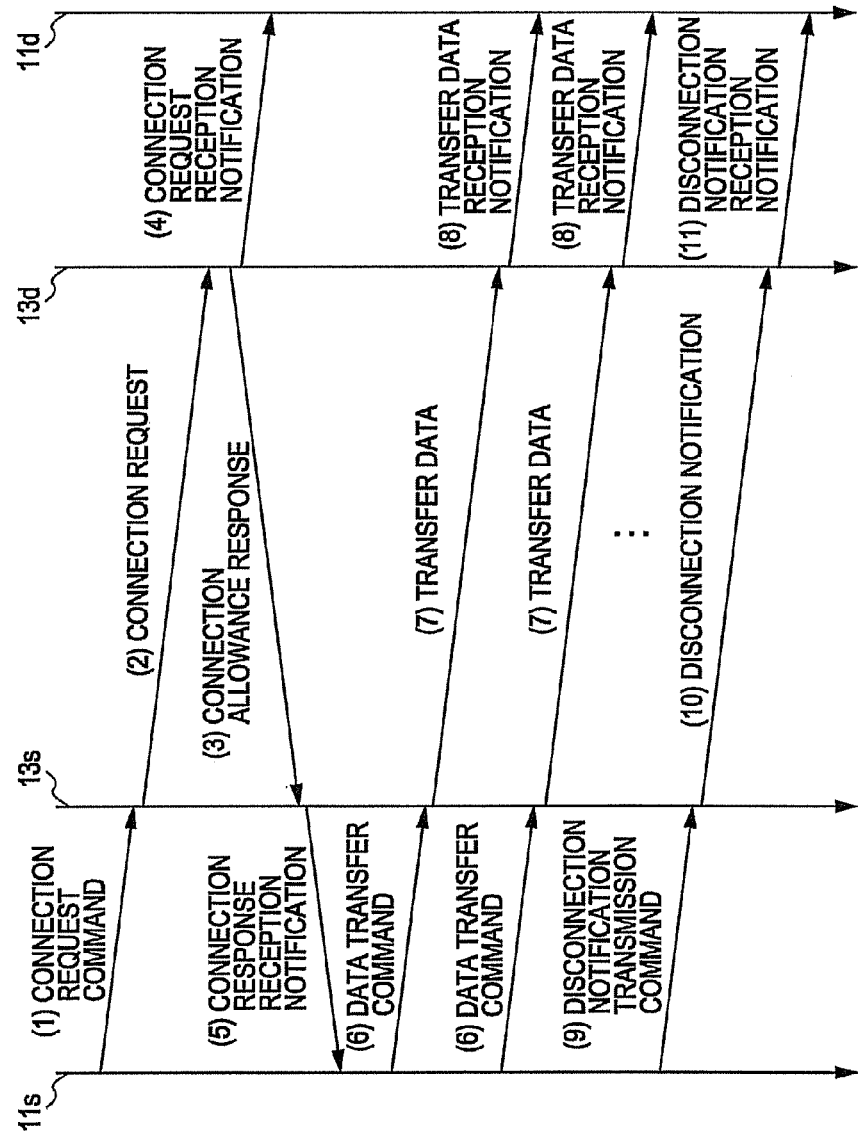
FIG. 11 illustrates a unidirectional communication exemplary operation in the embodiment.

FIG. 11 illustrates a unidirectional communication exemplary operation.

FIG. 11 illustrates a sequence of the exemplary operation in which data is transferred from an originating node 10 illustrated in FIG. 1 (hereinafter referred to as "the originating node 10s") to a destination node 10 illustrated in FIG. 1 (hereinafter referred to as "the destination node 10d") in the system of this embodiment. In FIG. 11, the processor 11 and the NIC 13 of the originating node 10s are illustrated as the processor 11s and the NIC 13s, respectively. Likewise, the processor 11 and the NIC 13 of the destination node 10d are illustrated as the processor 11d and the NIC 13d, respectively.

Data transfer from the port being executed at the processor 11s of the originating node 10s to the port being executed at the processor 11d of the destination node 10d is performed through the following procedures:

(1) The processor 11s of the originating node 10s (the processor 11s will be hereinafter referred to as "the originating processor 11s") notifies the NIC 13s of the originating node 10s (the NIC 13s will be hereinafter referred to as "the originating NIC 13s") of a "connection request command".

(2) Upon receiving the connection request command from the originating processor 11s, the originating NIC 13s transmits a "connection request" to the NIC 13d of the destination node 10d (hereinafter the NIC 13d will be referred to as "the destination NIC 13d").

(3) Upon receiving the connection request from the originating NIC 13s, the destination NIC 13d returns a connection allowing response to the originating NIC 13s.

(4) The destination NIC 13d then notifies the processor 11d of the destination node 10d (the processor 11d will be hereinafter referred to as "the destination processor 11d") of reception of the connection request.

(5) Upon receiving the connection allowing response from the destination NIC 13d, the originating NIC 13s notifies the originating processor 11s of reception of the connection allowing response.

(6) Upon receiving the notification of the connection response reception from the originating NIC 13s, the originating processor 11a instructs the originating NIC 13s to perform "data transfer".

(7) Upon receiving the data transfer command from the originating processor 11s, the originating NIC 13s transmits the "transfer data" designated by the originating processor 11s to the destination NIC 13d.

(8) Upon receiving the transfer data from the originating NIC 13s, the destination NIC 13d notifies the destination processor 11d of reception of the transfer data. The above procedures (6) through (8) are repeated until the originating process 11s transmits all transfer data to the destination processor 11d.

(9) After transmitting all the transfer data to the destination processor 11d, the originating processor 11s instructs the originating NIC 13s to transmit a "disconnection notification".

(10) Upon receiving the disconnection notification transmission command from the originating processor 11s, the originating NIC 13s transmits a "disconnection notification" to the destination NIC 13d.

(11) Upon receiving the disconnection notification from the originating NIC 13s, the destination NIC 13d notifies the destination processor 11d of reception of the disconnection notification.

The exemplary procedures (1) through (11) are carried out, so that a communication connection is established between the originating NIC 13s and the destination NIC 13d, and data is transferred from the originating processor 11s to the destination processor 11d. After the originating processor 11s transmits all the transfer data to the destination processor 11d, the communication connection between the originating NIC 13s and the destination NIC 13d is cut off. The communication connection is a communication connection at the transport layer of the OSI reference model.

As described above, according to this embodiment, the originating NIC 13s and the destination NIC 13d perform the processing to establish a communication connection for transferring data. Each of the commands and notifications between the processors 11 and the NICs 13 is sent with the use of the port table 121, the port context 123 and the port buffer 125. Those components 121, 123 and 125 are managed in conjunction with port numbers.

A connection request transmission is disclosed.

Figure 12:
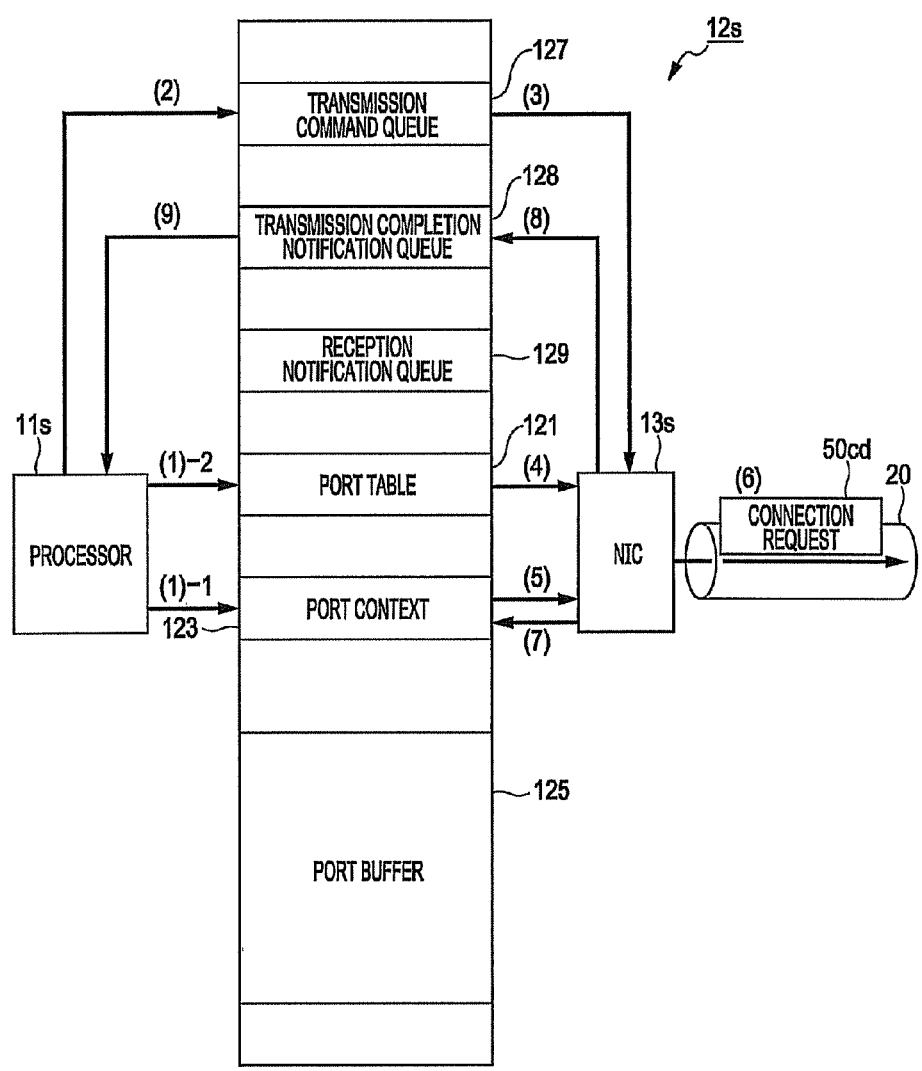
FIG. 12 illustrates an exemplary operation to be performed by an originating processor to instruct the corresponding originating NIC to issue a "connection request"

FIG. 12 illustrates an exemplary operation to be performed by the originating processor 11s to instruct the originating NIC 13s to issue a "connection request", so as to establish a communication connection. The procedures illustrated in FIG. 12 are described below.

(1) Initial Setting: The originating processor 11s secures the port context 123 in the corresponding main storage 12 (hereinafter referred to as "the main storage 12s"), and sets the communication state 1232 in the port context 123 to the "stand-by state" ((1)-1). The originating processor 11s then registers the port context 123 in the port table 121 in the main storage 12s ((1)-2).

(2) Connection Request Command: The originating processor 11s writes the descriptor 1331 of a connection request transmission command into the transmission command queue 127.

(3) Connection Request Transmission Command Readout: The originating NIC 13s reads the descriptor 1331 of the connection request transmission command from the transmission command queue 127.

(4) Port Table Readout: The originating NIC 13s reads originating port number 1331b from the descriptor 1331 of the connection request transmission command. The originating NIC 13s then reads the storage address of the port context 123 of the originating port from the port entry 1211 in the port table 121 according to the readout port number 1331b.

(5) Port Context Readout: The originating NIC 13s reads the port context 123 from the readout storage address, and checks whether the communication state 1232 written in the port context 123 is set at the "stand-by state".

(6) Connection Request Packet Transmission: The originating NIC 13s creates a connection request packet 50cd to be sent to the destination NIC 13d, and transmits the created connection request packet 50cd to the network 20. The connection request packet 50cd is a control packet 50 having the format illustrated in FIG. 9, and its packet type 624 is set to the "connection request".

(7) Port Context Updating: The originating NIC 13s updates the communication state 1232 in the port context 123 to the "connection requested state".

(8) Transmission Completion Notification Writing: The originating NIC 13s writes the descriptor of a "transmission completion status" into the transmission completion notification queue 128. The descriptor of the "transmission completion status" is the descriptor 1351 having the format illustrated in FIG. 7A.

(9) Transmission Completion Notification Readout: The originating processor 11s reads the descriptor of the transmission completion status from the transmission completion notification queue 128. Referring to the descriptor of the transmission completion status, the originating processor 11s checks whether the connection request packet 50cd has been properly transmitted to the destination processor 11d. If the transmission completion status is set at "success", the originating processor 11s determines that the connection request packet 50cd has been properly transmitted to the destination processor 11d. If the transmission completion status is set at "failure", the originating processor 11s determines that the originating NIC 13s has failed to transmit the connection request packet 50cd.

A connection request reception is disclosed.

Figure 13:
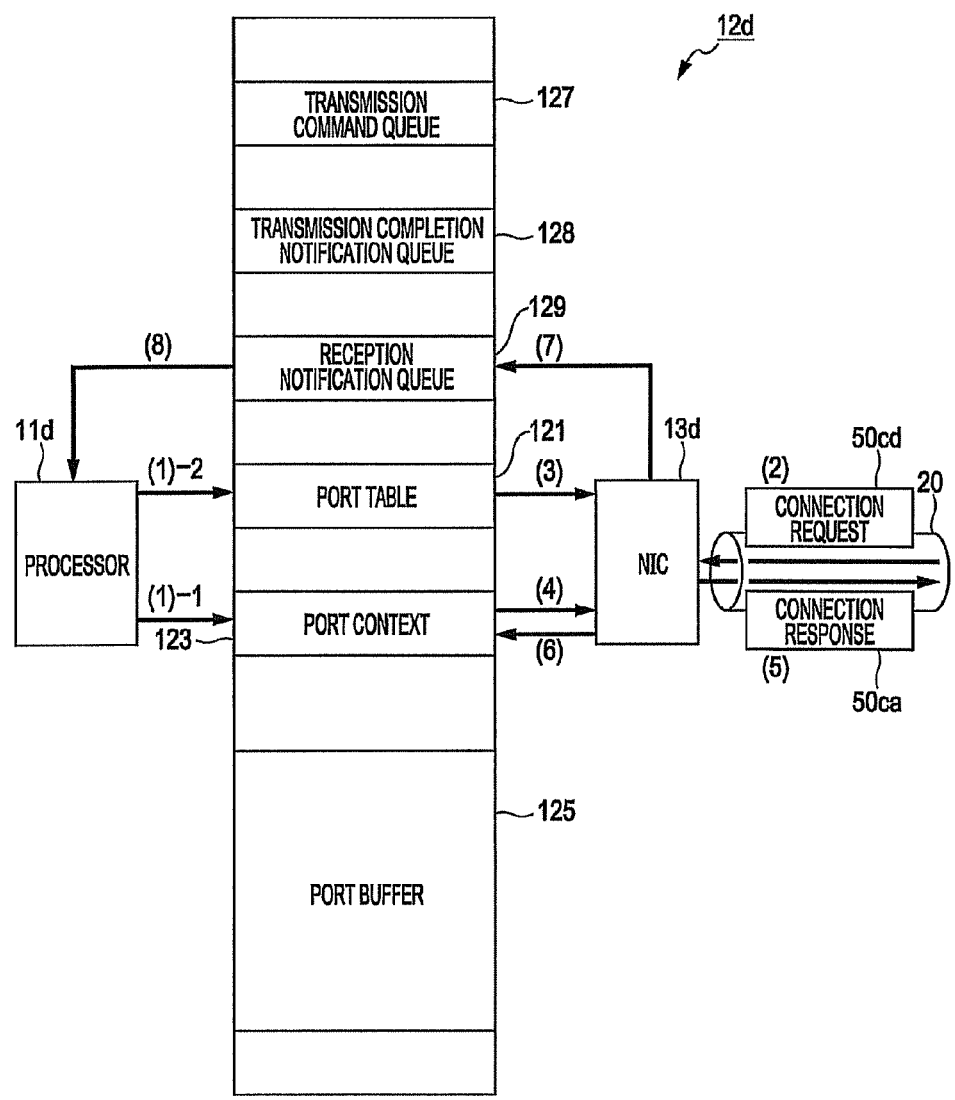
FIG. 13 illustrates an exemplary operation to be performed by a destination NIC to receive a connection request packet from the originating NIC and transmit a "connection allowance" response packet to the originating NIC.

FIG. 13 illustrates an exemplary operation to be performed by the destination NIC 13d to transmit a response packet of "connection allowance" to the originating NIC 13s, after receiving connection request packet 50cd from the originating NIC 13s. The exemplary procedures illustrated in FIG. 13 are described below.

(1) Initial Setting: The destination NIC 13d secures the port context 123 in the corresponding main storage 12 (hereinafter referred to as "the main storage 12d"), and sets the communication state 1232 in the port context 123 to the "stand-by state" ((1)-1). The destination NIC 13d then registers the port context 123 in the port table 121 in the main storage 12d ((1)-2).

(2) Connection Request Packet Reception: The destination NIC 13d receives the connection request packet 50cd transmitted from the originating NIC 13s via the network 20.

(3) Port Table Readout: The destination NIC 13d reads the port number from the field of the destination port number 1331d written in the connection request packet 50cd, and refers to the port entry 1211 corresponding to the port number in the port table 121. The destination NIC 13d then reads the address set in the "Context Address" of the port entry 1211 in the main storage 12d. This address is the storage address (the context storage address) of the port context 123 of the destination port having the port number allotted thereto in the main storage 12d.

(4) Port Context Readout: The destination NIC 13d reads the port context 123 from the context storage address of the destination port in the main storage 12d, and checks whether the communication state 1232 in the port context 123 is set at the "stand-by state".

(5) Connection Response Packet Transmission: After checking the communication state, the destination NIC 13d creates a connection allowance response packet 50ca, and transmits the created connection allowance response packet 50ca to the network 20. The connection allowance response packet 50ca is a control packet 50 having the format illustrated in FIG. 9, and its packet type 624 is set to the "connection allowance".

(6) Port Context Updating: The destination NIC 13*d* updates the port context 123 to the "connection requested state".

(7) Reception Notification Writing: The destination NIC 13*d* writes the descriptor of a "reception status" into the reception notification queue 129 in the main storage 12*d*. This descriptor is the descriptor 1371 illustrated in FIG. 8A.

(8) Reception Notification Readout: The destination processor 11*d* reads the descriptor of the reception status from the reception notification queue 129. The destination processor 11*d* checks whether the reception status is set at "success". If the reception status is set at "success", the destination processor 11*d* determines that the destination NIC 13*d* has properly received the connection request packet 50*cd* transmitted from the originating processor 11*s*. If the reception status is set at "failure", the destination processor 11*d* determines that the destination NIC 13*d* has failed to receive the connection request packet 50*cd*.

If the destination NIC 13*d* recognizes that the communication state 1232 in the port context 123 of the destination port is not the "stand-by state" in the procedure (4), the destination NIC 13*d* transmits a connection rejection response packet to the network 20 in the procedure (5).

A connection request response reception is disclosed.

Figure 14:
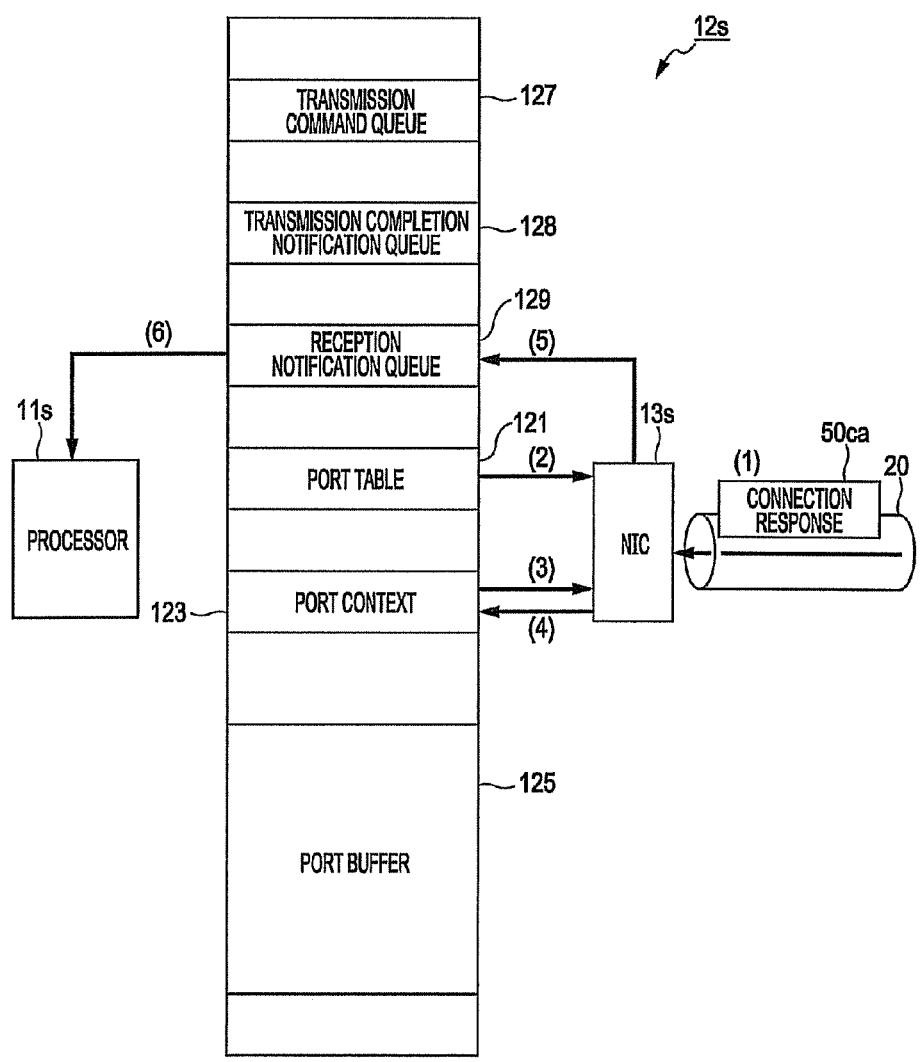
FIG. 14 illustrates an exemplary operation to be performed by the originating NIC upon receipt of the "connection allowance" response packet from the destination NIC.

FIG. 14 illustrates an exemplary operation to be performed by the originating NIC 13*s* upon receiving the "connection allowance" response packet 50*ca* from the destination NIC 13*d*. The procedures illustrated in FIG. 14 are described below.

(1) Connection Response Packet Reception: The originating NIC 13*s* receives the "connection allowance" response packet 50*ca* from the network 20.

(2) Port Table Readout: The originating NIC 13*s* reads the port number from the field of the destination port number 1331*d* in the received response packet 50*ca*. The originating NIC 13*s* then reads the address set in the field of the "Context Address" of the port entry 1211 in the port table 121 in the main storage 12*s* corresponding to the read port number.

(3) Port Context Readout: The originating NIC 13*s* accesses the read address in the main storage 12*s*, and reads the port context 123 from the address. The originating NIC 13*s* then checks whether the communication state 1232 in the read port context 123 is set at the "connection requested state".

(4) Port Context Updating: After checking the communication state, the originating NIC 13*s* updates the communication state 1232 in the port context 123 in the main storage 12*s* to the "connected state".

(5) Reception Notification Writing: The originating NIC 13*s* writes the descriptor of the "reception status" into the reception notification queue 129 in the main storage 12*s*. This descriptor of the reception status is the descriptor 1371 having the format illustrated in FIG. 8A.

(6) Reception Notification Readout: The originating processor 11*s* reads the descriptor of the "reception status" from the reception notification queue 129. The originating processor 11*s* checks whether the reception status is set at "success". If the reception status is set at "success", the destination processor 11*d* determines that the destination NIC 13*d* has allowed the "connection request". Accordingly, a communication connection is established between the originating port and the destination port.

The originating NIC 13*s* might receive the connection rejection response packet in the above procedure (1), and might confirm that the communication state 1232 in the port context 123 corresponding to the destination port number 1331*d* is the "connected state" in the procedure (3). In such a case, the originating NIC 13*s* returns the communication state 1232 of the port context 123 to the "stand-by state". Here, the destination NIC 13*d* does not transmit the "connection allowance" response packet to the originating NIC 13*s*.

Figure 15:
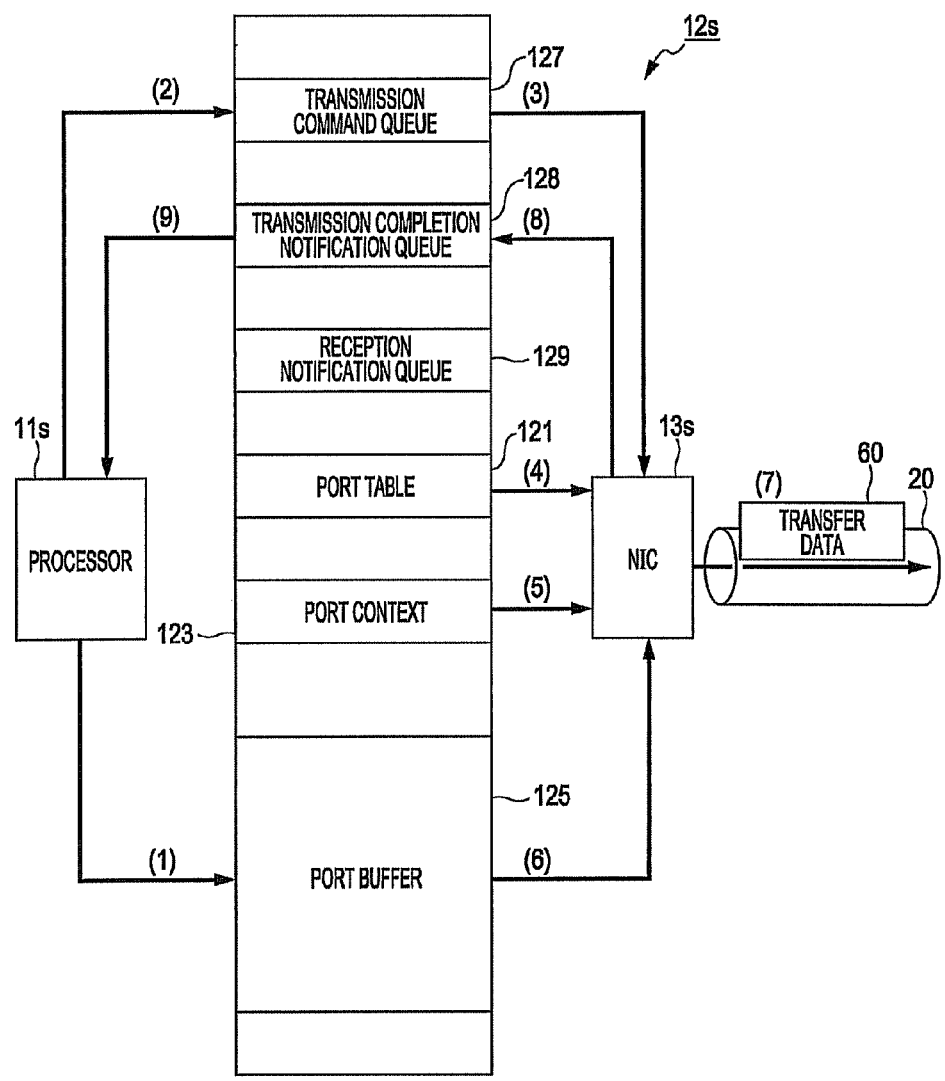
FIG. 15 illustrates an exemplary operation to transmit transfer data from the originating port.

FIG. 15 illustrates an exemplary operation to transmit transfer data from a connected port (the originating port). The procedures illustrated in FIG. 15 are described below.

(1) Transfer Data Writing: The originating processor 11*s* stores "transfer data" into the port buffer 125 in the main storage 12*s*.

(2) Data Transfer Command: The originating processor 11*s* writes the data transfer command descriptor 1332 (see FIG. 6B) into the transfer command queue 127 in the main storage 12*s*.

(3) Transmission Command Readout: The originating NIC 13*s* reads the data transfer command descriptor 1332 from the transfer command queue 127 written in the transmission command queue 127.

(4) Port Table Readout: The originating NIC 13*s* reads the address of the port context 123 of the destination port in the main storage 12*s* from the port table 121, based on the originating port number set in the field of the originating port number 1332*b* of the descriptor 1332. More specifically, the originating NIC 13*s* reads the contents of the port entry 1211 corresponding to the port number from the port table 121. The address set in the field of "Context Address" of the port entry 1211 is regarded as the storage address of the port context 123 of the destination port.

(5) Port Context Readout: The originating NIC 13*s* reads the port context 123 from the storage address in the main storage 12*s*, and checks whether the communication state 1232 is set at the "connected state".

(6) Transfer Data Readout: The originating NIC 13*s* reads the transfer data from the port buffer 125 in the main storage 12*s*, based on the address set in the field of "Buffer Address" in the port entry 1211 and the buffer size set in the field of "Buffer Size".

(7) Transfer Data Packet Transmission: The originating NIC 13*s* creates a transfer data packet 60 having the format illustrated in FIG. 10, and transmits the created transfer data packet 60 to the network 20.

(8) Transmission Completion Notification Writing: The originating NIC 13*s* writes a transmission completion status descriptor into the transmission completion notification queue 128. This transmission completion status descriptor is the descriptor 1352 having the format illustrated in FIG. 7B.

(9) Transmission Completion Notification Readout: The originating processor 11*s* reads the transmission completion status from the transmission completion notification queue 128. The originating processor 11*s* then checks whether the transmission completion status is set at "success". If the transmission completion status is set at "success", the originating processor 11*s* determines that the originating NIC 13*s* has properly transmitted the transfer data packet 60. In such a case, the transmission of the transfer data from the originating port to the destination port has been properly completed.

If the transmission completion status is set at "failure", the originating processor 11*s* determines that the originating NIC 13*s* has failed to transmit the transfer data packet 60. In such a case, the transmission of the transfer data packet 60 from the originating port to the destination port has failed.

Figure 16:
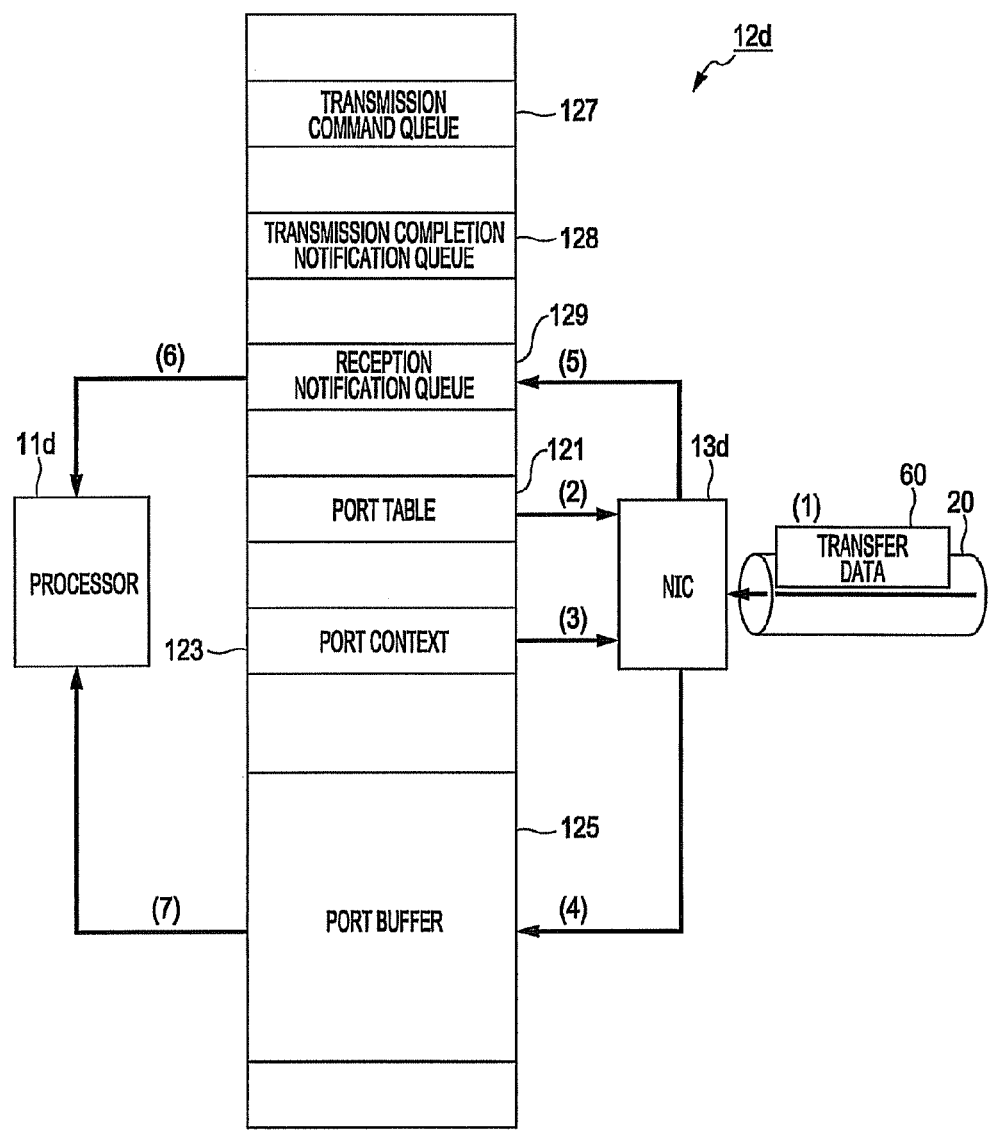
FIG. 16 illustrates an exemplary operation to be performed by the destination port to receive the transfer data transmitted from the originating port.

FIG. 16 illustrates an exemplary operation to be performed by the connected destination port to receive the transfer data transmitted from the originating port. The procedures illustrated in FIG. 16 are described below.

(1) Transfer Data Packet Reception: The destination NIC 13d receives the transfer data packet 60 transmitted from the originating NIC 13s via the network 20.

(2) Port Table Readout: The destination NIC 13d withdraws the destination port number 621 from the transfer data packet 60, and reads the "Context Address" from the port entry 1211 corresponding to the destination port number 621 in the port table 121 in the main storage 12d.

(3) Port Context Readout: The destination NIC 13d reads the port context 123 from the context storage address in the main storage 12d. Referring to the communication state 1232 in the port context 123, the destination NIC 13d checks whether the port having received the transfer data packet 60 is in the "connected state".

(4) Transfer Data Writing: The destination NIC 13d reads the transfer data 630 stored in the transfer data packet 60, and stores the read transfer data 630 into the port buffer 125 in the main storage 12d.

(5) Reception Notification Writing: The destination NIC 13d writes a reception status into the reception notification queue 129 in the main storage 12d. This reception status is the data transfer descriptor 1373 illustrated in FIG. 8B.

(6) Reception Notification Readout: The destination processor 11d reads the reception status from the reception notification queue 129.

(7) Transfer Data Readout: The destination processor 11d refers to the data top address 1373c and the data length 1332d in the reception status, and reads the transfer data from the port buffer 125. In this manner, the destination port receives the transfer data transmitted from the originating port.

A disconnection notification transmission is disclosed.

Figure 17:
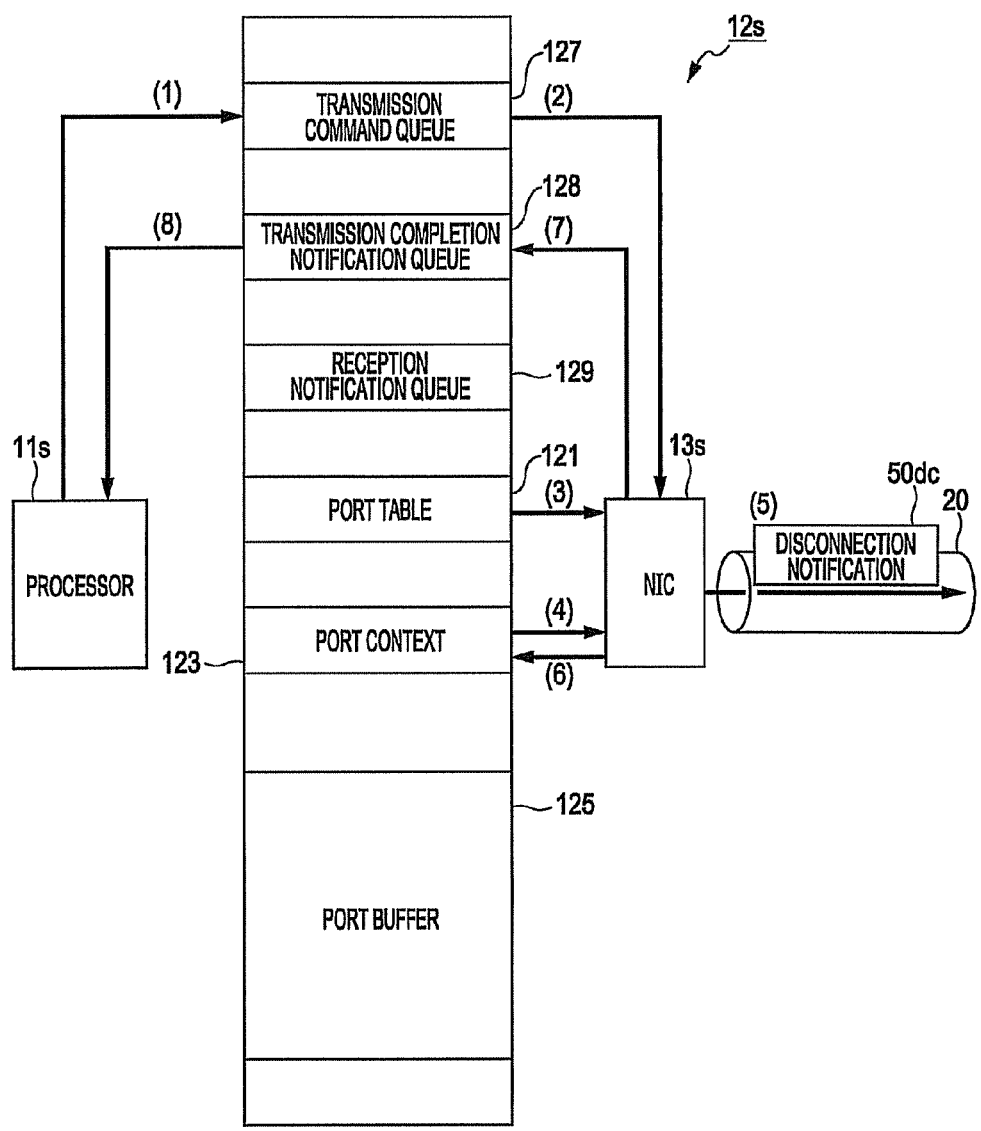
FIG. 17 illustrates an exemplary operation to be performed by the originating port to transmit a disconnection notification to the destination port.

FIG. 17 illustrates an exemplary operation to be performed by the connected originating port to transmit a disconnection notification to the destination port. The procedures illustrated in FIG. 17 are described below.

(1) Disconnection Notification Transmission Command: The originating processor 11s writes a descriptor of a "disconnection notification transmission command" into the transmission queue 127 in the main storage 12s. This descriptor of the disconnection notification transmission command is the same as the disconnection notification transmission command descriptor 1333 illustrated in FIG. 6C.

(2) Disconnection Notification Transmission Command Readout: The originating NIC 13s reads the disconnection notification transmission command descriptor 1333 from the transfer command queue 127.

(3) Port Table Readout: The originating NIC 13s reads the originating port number 1333b from the read disconnection notification transmission command descriptor 1333, and reads the "Context Address" from the port entry 1211 corresponding to the originating port number 1333b in the port table 121.

(4) Port Context Readout: The originating NIC 13s reads the port context 123 from the context storage address in the main storage 12s, and checks whether the communication state 1232 in the read port context 123 is the "connected state".

(5) Disconnection Notification Packet Transmission: The originating NIC 13s creates a disconnection notification packet 50dc, and transmits the created disconnection notification packet 50dc to the network 20. The disconnection notification packet 50dc is a control packet 50 having the format illustrated in FIG. 9, and its packet type 624 is set at the "disconnection Notification".

(6) Port Context Updating: The originating NIC 13s updates the communication state 1232 in the port context 123 to a "disconnection notification completed state".

(7) Transmission Completion Notification Writing: The originating NIC 13s writes a "transmission completion status" into the transmission command queue 127 in the main storage 12s. This transmission completion status is the same as the disconnection notification transmission completion descriptor 1353 illustrated in FIG. 7C.

(8) Transmission Completion Notification Readout: The originating processor 11s reads the transmission completion status from the transmission command queue 127. If the transmission completion status is set at "success", the originating processor 11s determines that the originating NIC 13s has properly transmitted the disconnection notification packet 50dc to the destination NIC 13d. In such a case, the transmission of the disconnection notification from the originating port to the destination port has been properly completed. If the transmission completion status is set at "failure", the originating processor 11s determines that the originating NIC 13s has failed to transmit the disconnection notification packet 50dc. In such a case, the disconnection notification is not transmitted from the originating port to the destination port.

A Disconnection Notification Reception is disclosed.

Figure 18:
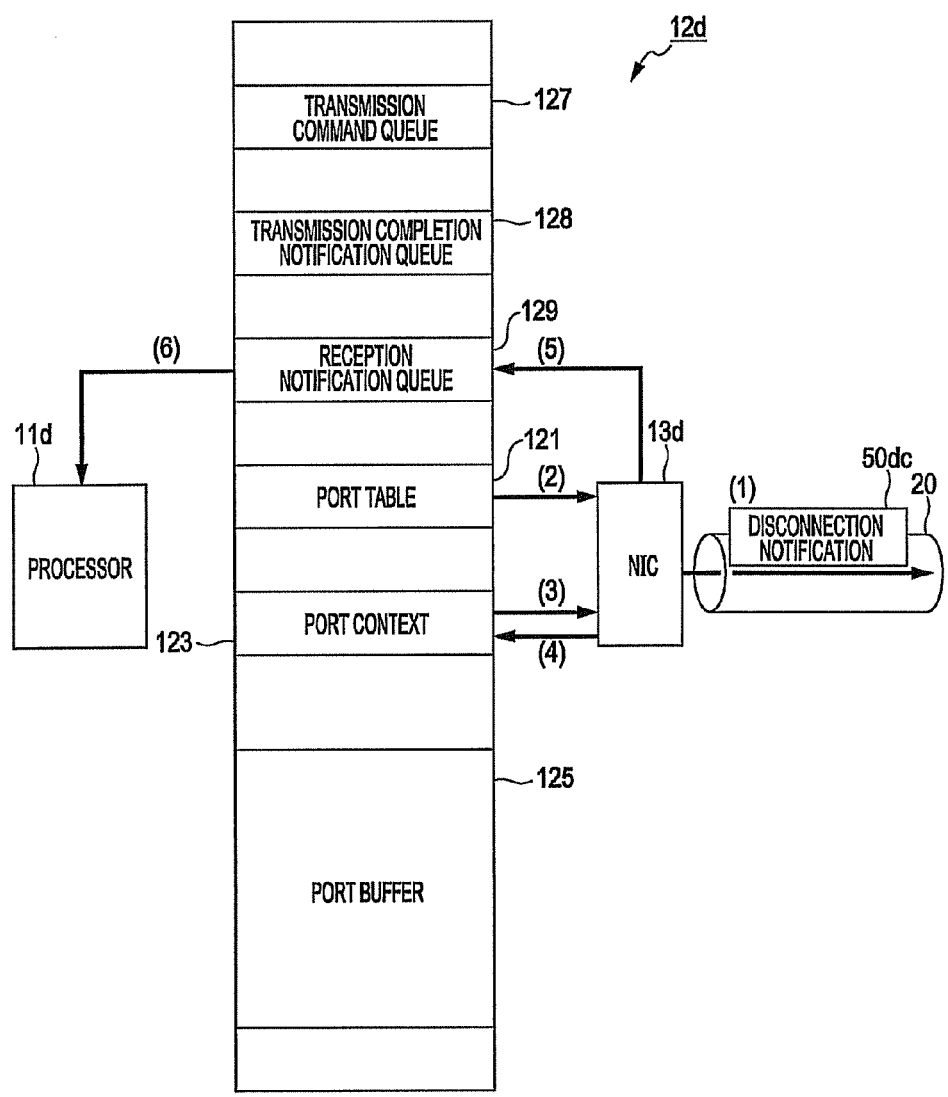
FIG. 18 illustrates an exemplary operation to be performed by the destination port to receive the disconnection notification from the originating port.

FIG. 18 illustrates an exemplary operation to be performed by the connected destination port to receive the disconnection notification from the originating port. The procedures illustrated in FIG. 18 are described below.

(1) Disconnection Notification Packet Reception: The destination NIC 13d receives the disconnection notification packet 50dc from the network 20.

(2) Port Table Readout: The destination NIC 13d reads the destination port number 621 from the received disconnection notification packet 50dc, and reads the "Context Address" from the port entry 1211 corresponding to the destination port number 621 in the port table 121 in the main storage 12d.

(3) Port Context Readout: The destination NIC 13d reads the port context 123 (the context of the destination port) from the context storage address in the main storage 12d, and checks whether the communication state 1232 in the port context 123 is set at the "connected state".

(4) Port Context Updating: The destination NIC 13d updates the communication state 1232 in the port context 123 to the "disconnection notification reception completed state".

(5) Reception Notification Writing: The destination NIC 13d writes a "reception status" into the reception notification queue 129 in the main storage 12d. This reception status descriptor is the same as the descriptor 1374 illustrated in FIG. 8C.

(6) Reception Notification Readout: The destination processor 11d reads the reception status from the reception notification queue 129. If the reception status is set at "success", the destination processor 11d determines that the destination NIC 13d has properly received the disconnection notification packet 50dc. Accordingly, the communication connection between the originating port and the destination port is cut off. If the reception status is set at "failure", the destination processor 11d determines that the destination NIC 13d has failed to receive the disconnection notification packet 50dc. In such a case, the communication connection between the originating port and the destination port is not cut off.

According to an exemplary embodiment, each NIC 13 establishes a unidirectional communication connection. In a case where bidirectional communications are performed with the use of NICs 13 of this embodiment, the processors only need to establish two unidirectional communication connections, using the NICs 13. When a bidirectional communication is performed with the use of NICs 13 of this embodiment, the processing load on the processors is reduced, compared with a case where regular NICs are used. Further, According to an exemplary embodiment, each port context 123 can define a state in which a communication connection is cut off.

Accordingly, by referring to each corresponding port context 123, each processor 11 can delay high-load exemplary operations such as collecting the communication resources, and can collectively perform those exemplary operations in appropriate timing.

According to an exemplary embodiment, a communication connection establishing exemplary operation is performed, based on the port context 123 provided in the main storage 12 of each processor 11. Accordingly, a larger number of communication connections can be maintained than in a case where conventional NICs that have offloading engines and perform communication processing are used. More specifically, since the port context 123 is retained in each main storage 12 having large storage capacity, the number of communication connections that can be maintained becomes larger.

Also, each NIC 13 of this embodiment manages communication connections between ports, using the main storage 12 of the corresponding processor 11. Accordingly, NICs 13 of this embodiment have the advantage that the hardware costs are lower than the conventional NICs having the offloading engines. Further, in a case where this embodiment is applied to applications such as Web applications that often have communication connection establishment and disconnection, the same decreases in the processing load on host processors as those in the case of the conventional NICs having the offloading engines can be expected.

The present invention is not limited to the above embodiment, and various modifications may be made to the embodiment, without departing from the scope of the invention.

For example, in the embodiment, the port context 123 and the port table 121 are provided in the main storage 12 of each processor 11. However, the present invention is not limited to that structure. Each port context and each port table may be provided in a special-purpose resistor or memory in each corresponding processor, for example. In such a case, it is desirable that the special-purpose register or memory can be accessed directly from a network interface device.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A network interface device that is connected to a computer and performs communications via a network, the network interface device comprising:
   a memory; and
   at least one processor coupled to the memory and configured to:
      identify a communication connection by a port number, and manages a communication connection state of each port by a context that is stored in a storage and is associated with the port number,
      manage a storage state of the context, and
      selectively perform, in reference to the context, an operation to establish a communication connection and an operation to cut off a communication connection between ports by referencing the storage state and update the communication state of the context in the storage corresponding with a current communication state of a port during processing of the operation,
   wherein the context contains at least information about a protocol type and information about the communication state of the port.

2. The network interface device according to claim 1, wherein,
   when a processor of the computer issues a command to transmit a connection request packet, the network interface device checks a context corresponding to a port number designated as an originator in the command, and, when the context is set at a "stand-by state", the network interface device transmits the connection request packet to the network.

3. The network interface device according to claim 2, wherein,
   after transmitting the connection request packet, the network interface device notifies the processor of the computer of transmission completion.

4. The network interface device according to claim 2, wherein,
   when receiving the connection request packet, the network interface device checks a context corresponding to a port number designated as a destination in the connection request packet,
   when the context is set at a "stand-by state", the network interface device transmits a connection allowance response packet to the network, and updates the context corresponding to the port number designated as the destination to a "connected state", and
   when the context corresponding to the port number designated as the destination is not set at a "stand-by state", the network interface device transmits a connection rejection response packet to the network.

5. The network interface device according to claim 4, wherein
   the network interface device receives the connection request packet and transmits the response packet, updates the context as needed, and notifies the processor of the computer of reception of the connection request packet.

6. The network interface device according to claim 4, wherein, when receiving the connection allowance response packet, the network interface device checks the context corresponding to the port number designated as the originator in the response packet, and, when the context corresponding to the port number designated as the originator is set at a "connection requested state", the network interface device updates the context to a "connected state".

7. The network interface device according to claim 4, wherein, when receiving the connection rejection response packet, the network interface device checks the context corresponding to the port number designated as the originator in the response packet, and, when the context corresponding to the port number designated as the originator is set at a "connected state", the network interface device returns the context to a "stand-by state".

8. The network interface device according to claim 6, wherein, after receiving the response packet and updating the context, the processor of the network interface device notifies the processor of the computer of reception of the response packet.

9. The network interface device according to claim 1, wherein, when a processor of the computer issues a command to transmit a disconnection notification packet, the network interface device checks a context corresponding to a port number designated as an originator in the command, and, when the context corresponding to the port number designated as the originator is set at a "connected state", the network interface device transmits the disconnection notification packet to the network.

10. The network interface device according to claim 9, wherein, when receiving the disconnection notification packet, the network interface device checks a context corresponding to a port number designated as a destination in the packet, and, when the context corresponding to the port number designated as the destination is set at a "connected state", the network interface device updates the context to a "disconnection notification reception completed state".

11. The network interface device according to claim 1, wherein the context and a management mechanism are provided in a main storage of the processor.

12. The network interface device according to claim 1, wherein, the context and a management mechanism are stored in a special-purpose register in the processor, and
the processor accesses the special-purpose register to manage a connection state of each port.

13. The network interface device according to claim 1, wherein, the context and a management mechanism are provided in a special-purpose memory in the processor, and
the processor accesses the special-purpose memory to manage a connection state of each port.

14. The network interface device according to claim 11, wherein, the management mechanism is a table,
the processor manages the context by the table, and
entries in the table include at least information about a storage location of the context.

15. A network interface device comprising:

a memory; and
at least one processor coupled to the memory and configured to:
manage a connection state of a port by a context that is stored in a storage and is associated with the port number;
manage a storage state of the context; and
control a connection between ports based on the context,
wherein the processor selectively performs, in reference to the context, an operation to establish a communication connection and an operation to cut off a communication connection between ports by referencing the storage state and updates a communication state of the context in the storage corresponding with a current communication state of a port during processing of the operation, and
wherein the context contains at least information about a protocol type and information about the communication state of the port.

16. A network interface device comprising:

a processor;
and a storage within the processor storing:
context information, identifying a connection state of each of a plurality of ports of the network interface device, each piece of context information associated with a port number, and
a port management table, storing the context information of each of the plurality of ports, arranged by port number,
wherein the processor is configured to:
identify a communication connection by a port number, and managing a communication connection state of each port by the context information,
manage a storage state of the context information, and
establish the communication connection and an operation to cut off the communication connection between ports, based on reference to the storage state and update the communication state of the context information read from the port management table corresponding with a current communication state of a port during processing of the operation, and
wherein the context contains at least information about a protocol type and information about the communication state of the port.

17. The network interface device according to claim 1, wherein a storage state of the context is updated in association with changes in the communication state of the context, during performance of the operation.

\* \* \* \* \*